Nov. 3, 1970  G. C. FLORIO  3,538,455
LASER APPARATUS
Filed Nov. 24, 1967  2 Sheets-Sheet 1
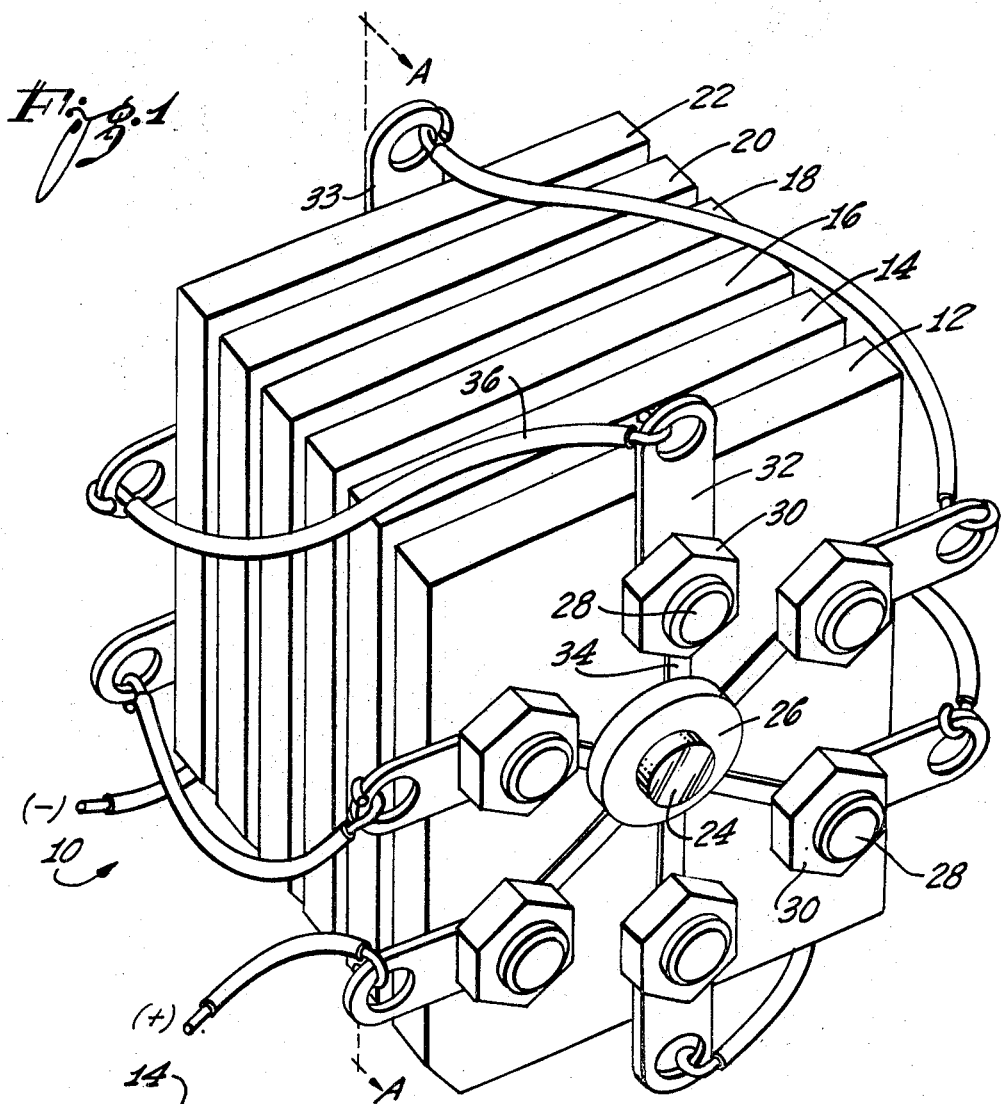
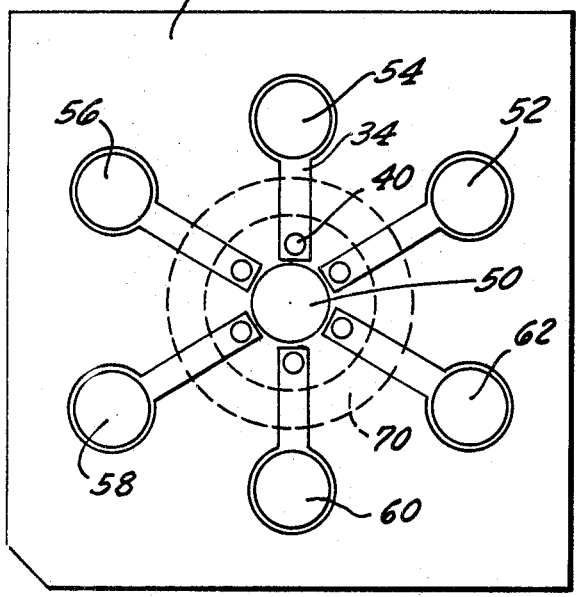
INVENTOR:
Gerald C. Florio
By Ronald M. Goldman
ATTORNEY Nov. 3, 1970   G. C. FLORIO   3,538,455
LASER APPARATUS
Filed Nov. 24, 1967   2 Sheets-Sheet 2
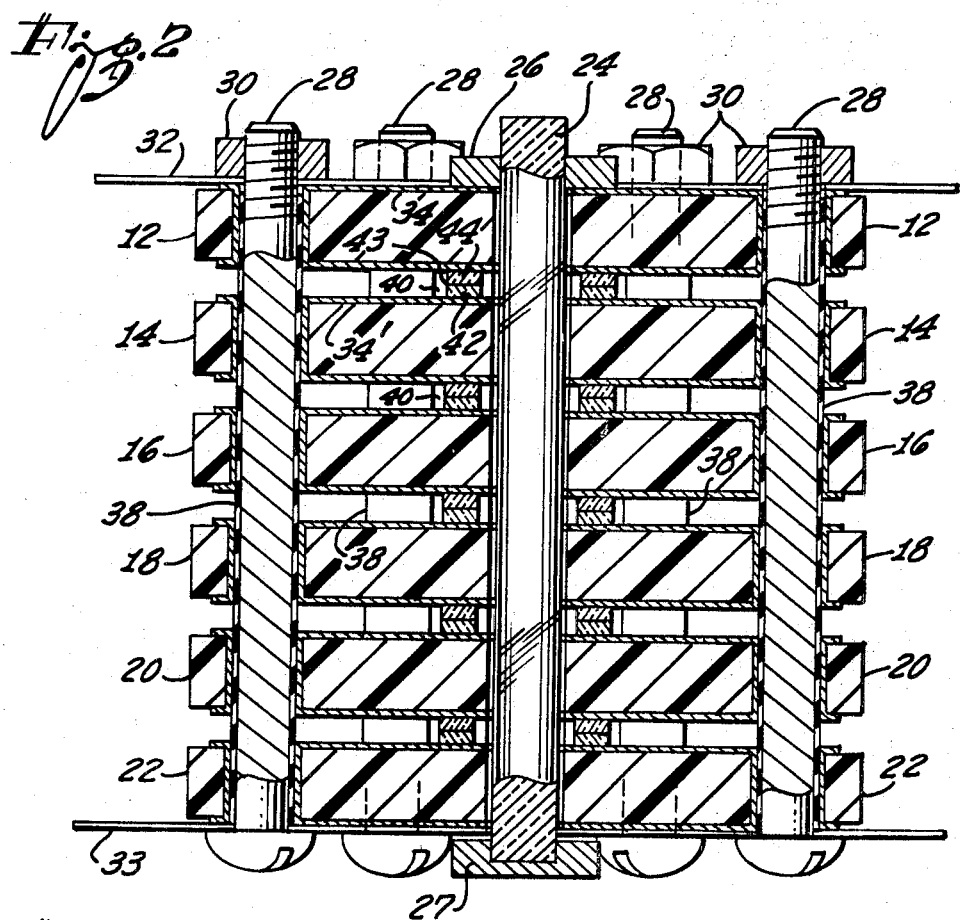
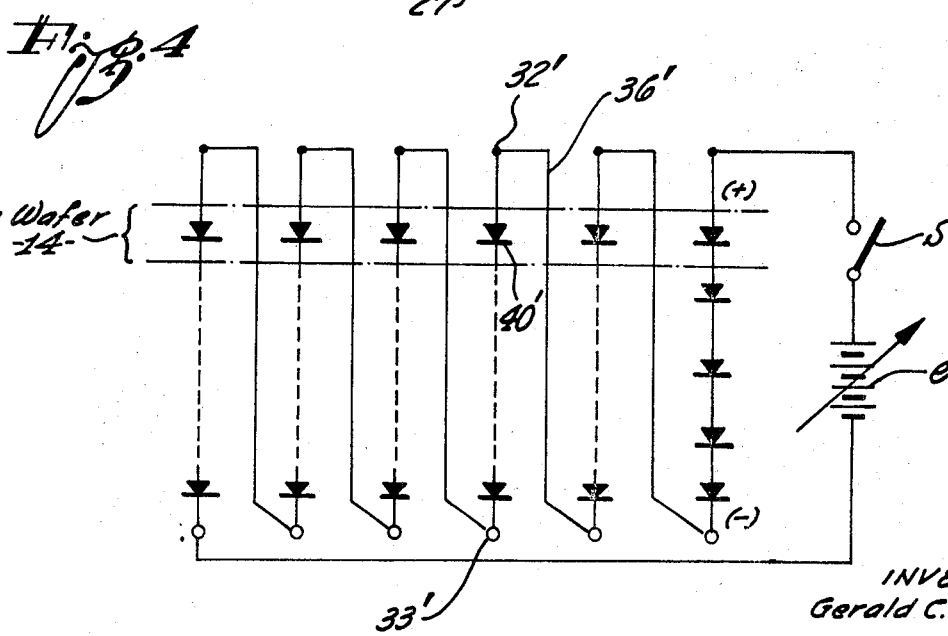
INVENTOR
Gerald C. Florio
By Ronald M. Goldman
ATTORNEY

United States Patent Office 3,538,455
Patented Nov. 3, 1970

3,538,455
LASER APPARATUS
Gerald C. Florio, Montclair, N.J., assignor to Litton Precision Products, Inc., San Carlos, Calif., a corporation of Delaware
Filed Nov. 24, 1967, Ser. No. 685,409
Int. Cl. H01s 3/00
U.S. Cl. 331—94.5
9 Claims

ABSTRACT OF THE DISCLOSURE

A generator of coherent light or laser is provided which includes a plurality of spaced stacked sheets or wafers of electrical insulating thermally conductive material having a central passage through each, and a rod of laser material is inserted in the passage formed by such stack of sheets. On one side of each sheet is affixed a plurality of discrete light emitting diodes spaced about the central passage. A plurality of separate conductive paths are provided on each sheet, each of which extends from a corresponding one of the diodes on one side of the sheet through an opening in the wafer to an underlying position on the other side of the sheet beneath that corresponding diode. The sheets are aligned so that one end of the diodes on one sheet abuts the corresponding one of the conductive paths on the adjacent sheet and the sheets are sandwiched together. Thus, each diode in each sheet is connected electrically in series with the corresponding aligned diodes in the other sheets to form columns of series connected diodes and the thermally conductive electrically insulating sheets serve as cooling fins. Additionally, a washer or nonconductive and infrared light reflective material is sandwiched between wafers to space the wafers and reflect any outwardly traveling light back toward the laser rod.

---

The present invention relates coherent light generators, and more particularly, to a mechanically simple and highly efficient arrangement for obtaining stimulated emission at room temperatures.

As is now well known in the art, the acronym "laser" stands for Light Amplification by Stimulated Emission of Radiation; and a laser device may operate either as an amplifier or a generator of coherent light. The active ions in laser material ordinarily occupy the lowest possible energy level available in the atomic structure. According to well known theory, such an ion exists in only one of a well-defined set of energy levels. To change the ion from one energy level to another requires a certain quantum of energy. As is known, light of specific frequencies, hence of specific energy quanta, is capable of supplying the required quantum of energy to the ion.

There is a close correspondence between a laser material's light absorption frequency and an ion's available energy levels within that material. Such light absorption frequency is proportional to the difference is energy between two of the available energy levels that an ion might occupy. Absorption of light energy by the laser material can, for a brief time interval, increase the proportion of ions occupying a high energy level within the particular material as compared with the ions in the lowest energy levels. When an ion of the laser material is illuminated with light of one of its critical frequencies, it absorbs a "quantum" of that light and jumps to a higher level. This process of raising ions to a higher energy level or "excited" quantum state, as it is sometimes called, by absorption of light energy is referred to as energy level inversion or population inversion, when the number of ions in the higher state exceeds those of a lower reference state.

From their excited quantum state, atoms of materials tend to return to normal or lower energy levels by spontaneously emitting energy. Through the phenomenon known as stimulated emission, however, ions can be made to give off energy before they emit energy spontaneously.

To accomplish this effect, light from a source of the proper frequency, commonly termed an optical pump, is directed upon a block of laser material. The laser block is fitted with two flat and parallel mirrors at least one of which is partially reflecting. The light energy is absorbed and causes a population inversion of ions. Some of the ions drop back to lower energy levels spontaneously emitting energy. As the light source causes an increasing spontaneous emission, the spontaneously emitted light energy is reflected back and forth in the laser material between the two mirrors. When a certain intensity of light radiation (called the threshold level) is built up between the mirrors simultaneously with the condition of population inversion in the laser material, stimulated emission occurs from those ions in their excited state. For a more complete description of this phenomenon reference is made to a publication by A. L. Schawlow and C. H. Townes which appeared in the Physical Review vol. 29, page 1940 (1958) and to U.S. Pat. 2,929,922.

The importance of stimulated emission arises from the fact that the newly released energy is precisely in phase; that is, coherent with the energy that stimulated its release.

In the prior art, the laser pumping source usually has taken the form of a mercury or tungsten flash lamp which emits light energy across a broad band of frequencies. However, as is known, laser materials absorb light energy only within a small portion of the output band of frequencies of the flash lamp. Thus, much of the energy emitted by the flash lamp is not absorbed by the laser material, and therefore is not only wasted but creates undesirable heating of the laser material. For this reason the conversion of pump power to laser radiation is presently very inefficient.

To alleviate this problem the prior art attempted to provide a coherent light source with a laser pumping source that radiates light energy only at a frequency within the absorption of the particular laser material. To accomplish this purpose one suggestion in the prior art was to use the light output emitted from gallium arsenide laser diodes. However, the number of solid state laser materials which may be pumped effectively using the coherent luminescent output of such laser diodes is severely limited. For example, in the prior art it has been demonstrated that gallium arsenide diodes may be used to stimulate photon emission from uranium doped calcium fluoride laser rods. However, in order to make such a combination operable, both the laser rod and the accompanying laser diodes had to be cooled to liquid helium temperatures. Thus, since the arrangement does not operate at room temperature, it is very impractical. Additionally, the absorption coefficient of the uranium ion in a calcium fluoride laser rod is extremely low in the frequency or radiation emitted by the gallium arsenide laser diode. For this reason, heretofore it has been found necessary to insert the calcium fluoride uranium rod into a mirrored cavity in order to obtain greater absorption of the laser diode radiation. In such construction the laser diodes are mounted along a slit in the side of the mirrored cavity.

Not only is it difficult to miniaturize the pumping source in such an arrangement, but also it is quite expensive to fabricate the pumping apparatus in this manner. Still further, laser diodes are considerably more costly than, for example, incoherent luminescent gallium arsenide diodes.

One proposed construction to overcome the cited difficulties uses a plurality of annular shaped light emitting diodes of a gallium arsenide-gallium phosphide composition sandwiched between conductive washers of an outer diameter larger than the outer diameter of the diode annulus with the laser rod positioned within the passage formed through the center holes of each diode and washer. As is apparent, the light emitted from around the inner periphery of each diode was directly incident upon the laser rod.

While simple in construction, the manufacture of annular shaped light emitting diodes appears to be of some difficulty in practice. Because the diodes are relatively large in size they have a tendency to develop cracks which render them useless. Consequently, the yield of diodes for production purposes is relatively low, and, accordingly, until the time that manufacturing processes are improved, the construction of that laser apparatus is more expensive than is desirable.

Therefore, it is an object of the invention to provide a laser which operates at room temperature; and It is a further object of the invention to provide an inexpensive, miniaturized, and mechanically simple diode pumped laser.

In accordance with one aspect of the invention, the foregoing objects are achieved by the use of a stacked plurality of luminescent diodes which radiate light energy at a frequency substantially solely within the absorption band of a desired laser material. A sheet or wafer of insulating material contains an opening for the insertion of a laser rod. Surrounding and spaced about this opening is a plurality of discrete diodes fastened to the sheet. A path of conductive material extends from one side of the wafer in contact with one of the discrete diodes to the other or back side thereof, and on the back side of the wafer to a position underlying the diode. Similar conductive paths are provided on the insulating wafer for each of the plurality of diodes. A plurality of such wafers are aligned and sandwiched together so that one end of each diode in a wafer contacts a conductive path along the bottom side of an adjacent wafer to form a plurality of columns of series connected diodes. In accordance with another aspect of the invention each of these columns of diodes is connected together electrically in series. In accordance with a further aspect, a ring of electrically non-conductive infrared light reflective material is sandwiched in between adjacent wafers to space the wafers and to reflect outwardly traveling light back toward the laser rod.

The foregoing and other advantages and features which are believed to be characteristic of the invention, both as to its organization and method of operation, together with further objects and advantages thereof, is better understood from the following description considered in connection with accompanying drawings in which one embodiment of the invention is illustrated by way of example. It is to be understood however that the drawings are for the purposes of illustration and description only, and are not intended as a definition of the limit of the invention.

In the drawings:

FIG. 1 schematically illustrates one embodiment of a miniaturized coherent light generator constructed in accordance with teachings of the present invention;

FIG. 2 is an enlarged cross-sectional view of the embodiment of FIG. 1 taken along the lines A—A;

FIG. 3 illustrates a single wafer construction found in FIGS. 1 and 2; and

FIG. 4 is a schematic of a wiring diagram for the diodes.

With reference to the drawings, where like or corresponding parts are similarly designated throughout the several figures, FIG. 1 illustrates in perspective an embodiment of the invention, laser apparatus 10. Laser apparatus 10 includes a plurality of spaced sheets or wafers 12, 14, 16, 18, 20, and 22 formed of a suitable material having high thermal conductivity and high electrical resistance. An elongated rod of laser material 24 extends through an opening in each of the six illustrated wafers and is held in place by a washer 26 at the front end, and by a similar washer, not visible, at the rear.

A plurality of bolts 28 extends through additional passages in the wafers and in between nuts 30 and the bolt heads clamps the wafers and other internal elements, not visible in this view, together in the illustrated sandwich arrangement. Additionally, each of the nuts 30 clamps an electrical terminal, such as terminal 32, in contact with a corresponding underlying conductive path, such as electrical lead or conductive path 34, hereinafter described in greater detail. Additionally, suitable external wires or electrical leads, such as lead 36, connects various ones of the electrical terminals, such as terminal 32, to other terminals or to an electrical source. The bolt head of bolt 28 likewise clamps electrical terminals at the rear, such as terminal 33, to conducting paths similar to path 34 on the bottom side of wafer 22.

FIG. 2 represents a cross section of the embodiment of FIG. 1 taken along the lines A—A, and which is enlarged slightly in order to better illustrate dimensionally small elements. This figure shows each of the six wafers 12, 14, 16, 18, 20, and 22 in the proper spaced relationship. A suitable centrally located passage is provided through each of the wafers to permit the insertion of the laser rod 24. Additional passages are provided spaced from the central passage which permits the insertion of each of bolts 28. Surrounding each bolt 28 within its corresponding passage is a sleeve 38 of insulating material which insulates the bolt from the insulating wafers and from the electrically conducting paths hereinafter described.

As noted in FIG. 1, an electrical path 34 on wafer 12 extends between the position of bolt 28 and nut 30, and the passage for rod 24 of laser material. Additionally, this conductive path extends through the bolt passage and around to the opposite or back side of wafer 12 to a location at the periphery of the laser rod passage underlying the conductor or conducting path portion on the front side of wafer 12. A corresponding conducting path 34' is included on wafer 14. Conductive path 34' extends from a location proximate the laser rod 24 around through the bolt passage to the other side of wafer 14 and terminates at a corresponding location at the bottom side of wafer 14 proximate the laser rod 24 and underlying the portion of the conductive path and diode 40 on the front side thereof. Similar conductive paths are provided in alignment with the foregoing on each of wafers 16, 18, 20, and 22. Between the front and back faces or sides of adjacent wafers and located proximate the laser rod passage and laser rod 24 are diodes 40. Each diode consists of an N-type region 42 and a P-type region 44, and forms a light emitting PN junction 43.

More particularly, each of the diodes, illustrated in FIG. 2, may be fabricated, for example, from a wafer of gallium arsenide. By using conventional vacuum deposition techniques to diffuse tellurium into one side of the wafer, an N-type material layer 42 is formed; and by diffusing zinc into the other side of the wafer, a P-type material layer 44 is formed. The junction of the layers 42 and 44 creates a typical P-N junction 43.

When a DC voltage is applied across the P-N junction of a gallium arsenide diode, such as diode 40, the current flow above a given amount through the diode in the forward direction causes the diode to emit incoherent light energy from the P-N junction 43. In order to effect a maximum transfer of this light energy to the laser rod 24, as shown in FIG. 2, the light emitting P-N junction 43 of each diode is positioned contiguous with the cylindrical surface of the laser rod 24. This is accomplished by surrounding the laser rod with a plurality of discrete diodes on the wafer and stacking numerous such wafers on the laser rod. The diodes surfaces may be metallized for better ohmic contact between the conductive paths and the adjacent diode surfaces. These diodes are the familiar light emitting components. One end of each diode contacts a conducting path, such as 34, on one wafer and at its other end contacts the conducting path of an adjacent wafer, such as 34'.

As is apparent in FIG. 2, the diodes are aligned to form a row or column and each of the diodes has its ends connected between the corresponding electrical conducting paths on the front and back sides of adjacent wafers.

In the embodiment of the invention illustrated in FIGS. 1 and 2 five additional columns of diodes are spaced about laser rod 24 at angles of approximately 60° between other spaced conducting paths in the same manner as just described. An electrical terminal 32 is clamped in contact with the upper portion of conducting path 34 by nut 30 and the lower or back portion of the conducting path on wafer 22 is in contact with electrical terminal 33. It is apparent from FIG. 2 that an electrical path exists from the top of each wafer through the metallized bolt passage and from there around the bottom or back side of each wafer and through the diode sandwiched between the wafers and conducting paths to the conducting path on the front face of next succeeding or adjacent wafers. This path commences at the electrical terminal 32 and terminates at electrical terminal 33. In like manner, each of the remaining five rows of light emitting diodes are placed in a series electrical circuit between the electrical terminals situated on the upper face of the first wafer and the terminal on the bottom face of the wafer 22.

Laser rod 24 is held in the illustrated position by washers 26 and 27. As is well known in the art, both ends of the laser rod 24 must be polished optically flat and parallel or be fitted with confocal mirrors. One end of the rod 24 is totally silvered, while the other end is partially silvered. The totally silvered end, of course, is totally reflective to photons being emitted by the ions of the laser rod 24, while the partially silvered end of the laser rod 24 reflects the photons only until such a time as they have sufficient energy to begin the photon cascade, the time when the laser material begins to "lase."

FIG. 3 shows a single one of the wafers, wafer 14, used in laser apparatus 10 of FIG. 1. The wafer is constructed of beryllium oxide a material which has the desired properties of high electrical resistance, which essentially makes it an electrical insulator, and high thermal conductivity which permits the wafer to transfer heat generated near the central passage out to its edges where it may be cooled by air convection currents or in any other conventional manner. A central opening 50 provides the passage for the insertion of the laser rod. Spaced from and about this opening at approximately 60° intervals is a plurality of openings 52, 54, 56, 58, 60, and 62 which form the passages for the bolts previously described. The conducting paths, such as path 34, are formed on each side of the wafer 14, from a location proximate opening 50 around and to the bolt openings, along the inner periphery of the bolt opening and along the underside or back of the wafer substantially underlying the portion of conductive material visible on the front side thereof. This conductive material preferably consists of molybdenum manganese nickel composition with a gold plating which is applied to the surfaces of the beryllium oxide wafer with conventional metallizing processes. On top of each of the six conducting metal paths, such as path 34, and for convenience on one side of each wafer, except the front wafer 12, six diodes, such as diode 40, are placed on top of the conductive material in a corresponding conducting path at a location near the periphery of the laser rod passage 50. The bottom side of each diode is affixed to the corresponding conductive path on the wafer with a conductive epoxy which is available from the Transeen Company of Danvers, Mass. under the trademark "Ohmex."

The completed wafers are then sandwiched together and the bolts are inserted through the appropriate openings to align all the bolt holes, the passage in each wafer for insertion of laser rod 24, and the diodes to form the rows or columns of series connected diodes in the arrangement illustrated in FIGS. 1 and 2. Additionally, each of the columns of diodes is connected by means of external electrical leads and the end electrical terminals in series electrically, as illustrated in FIG. 4, for connection to a conventional source of current.

Because of the efficient energy transfer between the diodes 40 and the laser rod 24, one is not limited in the selection of materials that may be used to form the laser rod. For example, a gallium arsenide diode of the construction previously described normally emits light energy at a narrow band of frequencies around 9000 angstroms. Assuming that one wishes to fabricate the laser rod from a material such as neodymium doped yttrium aluminum garnet, which best absorbs light between 8050 and 8150 angstroms, one may "tailor" the frequency of emission of the diodes 28 by doping the diodes so that they pump the laser material at its most efficient energy band. For example, it has been found that by substituting in gallium arsenide fifteen atomic percent of phosphorous for arsenic, a solid solution of gallium arsenide and gallium phosphide of relative mole proportions of 85% and 15% is formed which has a higher energy gap than pure gallium arsenide. Accordingly, higher energy photons are emitted from the diodes prepared in this manner. When biased in their forward direction, the emitted radiation wavelength is changed from a narrow band of wavelengths about 9000 angstroms observed for pure gallium arsenide to a narrow band of wavelengths about 8050 angstroms.

The applicability of the neodymium yttrium aluminum garnet as a laser material is well described in the literature, for example, in the article by J. A. Koningstein and J. E. Geusic entitled, "Energy Levels and Crystal-Field Calculations of Neodymium in Yttrium Aluminum Garnet" which was published in The Physical Review, vol. 136, No. 3A, pp. A711–A716, Nov. 2, 1964. Because of the flexibility of light output of the diodes 40, the laser rod 24 may also be fabricated of a number of other suitable materials which operate as lasers at room temperature. For example, rather than neodymium-yttrium aluminum garnet, the laser rod 24 could be fabricated using a holmium doped erbium oxide material or holmium and erbium doped yttrium aluminum garnet.

FIG. 4 illustrates the electrical wiring diagram. As discussed in FIG. 2, the diodes are arranged in electrically in series connected rows or columns between electrical terminals located on the top and bottom wafers such as terminals 32' and 33' in FIG. 4. Additionally, external electrical conductors connect these rows together in series and in the same polarity as is indicated for one by the lead 36 in FIG. 1, and 36' in FIG. 4. A source of electrical current is connected by a switch electrically in series with the rows of diodes.

Thus, in operation, it is apparent that with the coherent light generator 10 of the present invention connected to a source of electric potential $e$, a voltage can be applied across the serially connected rows of diodes 40, thereby causing them to emit light from their P-N junctions 43. More particularly, as shown in FIG. 4, the positive terminal of the electric potential source $e$ is connected through a switch $s$ and external wires to positive polarity terminals of a row of diodes, and the negative terminal of the potential source $e$ is connected to the negative polarity terminal of a row diodes to permit the application of a DC voltage across the serially connected diodes 40 in the current conducting or forward direction.

In order to produce an optimum average current level from diode to diode, the current is gradually increased while a measurement is made of the diodes output radiation. At a certain critical point, the heat losses start to reduce the output radiation from the diodes. At the optimum current level, however, a maximum amount of light radiation is transferred to the laser rod 24. Since each of the diodes has a DC current passing therethrough, they commence the emission of incoherent light of the selected frequency (for example, in the infrared band) from its respective P-N junction. This light is emitted directly into the laser rod 24 from all directions around the circumference of the rod 24. With such an arrangement, the optical or light pumping of the laser rod 24 is obviously of greater efficiency. Since an abundance of photons are emitted by the diodes 40 at a very efficient absorbing band (8050 angstroms, for example in $Nd^{3+}$ doped YAG) of the laser material. Because so little radiation is lost in the form of heat in the laser material, the threshold for stimulated emission is reached at lower power inputs to the pump. This is to say, coherent output from the laser rod (10,600 angstroms in the case of $Nd^{3+}$ doped YAG) is observed sooner, and at a higher output level than observed with tungsten lamps provided cooling and diode construction permit efficient diode luminescense.

It is noted that the bolt 28 may be constructed of electrical insulating material such as nylon. In that instance the need for insulating sleeve 38 no longer exists and it may be deleted. Additionally, it is apparent that each of the conductive paths, such as 34 may extend through the individual wafers by proceeding through the laser rod opening in those wafers between the end wafers instead of the bolt passages as illustrated. However, for production efficiency it is desired to have all wafers of substantially identical construction and the construction illustrated is preferred.

FIG. 3 also illustrates a modification of the invention that includes a ring or washer 70 of aluminum oxide indicated by the dashed lines. A washer is attached to one side of each wafer with nonconductive epoxy so that its inner annulus or inner periphery surrounds the group of six diodes on the wafer. Additionally, the thickness of each washer 74 is slightly less than the thickness of diodes 40.

The wafers are assembled to form a sandwich, in the same manner as illustrated in FIGS. 1 and 2. Accordingly, each of the plurality of washers 74 is sandwiched between a pair of adjacent wafers in this embodiment.

Because aluminum oxide is a suitable electrically nonconductive material, the washer can be attached in an overlapping relationship with the conductive paths, such as 34, on the wafers. Moreover, it has been found that aluminum oxide reflects light in the infrared frequencies which is the frequency range of interest for optically pumping the laser rod in the preferred embodiment. Accordingly, the position and location of washer 74 acts to reflect from the inner periphery thereof outwardly traveling infrared light, generated by diodes 40, inwardly back toward the laser rod. Accordingly, this construction increases the efficiency of the apparatus.

It is apparent that other materials which are electrically nonconducting and which are light reflecting may be used instead of aluminum oxide, either in the embodiments discussed or in other combinations where the reflecting properties of aluminum oxide are not suitable.

While the figures illustrate only six wafers for clarity, it is apparent that the number of wafers may be increased as the laser rod is lengthened. In a preferred embodiment seventeen such wafers were used. Likewise, if space permits, a greater number of diodes may be included on each wafer.

It is to be understood that the above-described arrangements are intended to be illustrative of the application of the principles of the invention and not to limit the invention since numerous other arrangements and equivalents suggest themselves to those skilled in the art which do not depart from the spirit and scope of the invention.

Accordingly, it is to be expressly understood that the invention is to be broadly construed within the spirit and scope of the appended claims.

What is claimed is:

1. A laser apparatus for generating coherent light energy comprising in combination: a plurality of wafers of electrically insulating thermelly conducting material each containing a centrally located first passage therethrough; each of said wafers including a plurality of distinct paths of electrically conducting material extending radially from a distinct plurality of locations about said central passage on one side to a corresponding location on the other side of said wafers, and a plurality of sets of light emitting diodes, each set of diodes including a plurality of diodes corresponding in number to said plurality of conductive paths in each wafer, one end of each diode in a set being in contact with a corresponding one of said conductive paths on one side of said wafer at a location proximate said passage; said plurality of sets corresponding in number to one less than said plurality of wafers, means sandwiching each of said plurality of wafers and diodes together with said first passages aligned and with the diodes in each set on one wafer in substantial axial alignment with the corresponding diodes in each set on the other wafers to form rows of diodes angularly spaced about said first passage, and wherein another end of each diode in a set in one wafer is in contact with the corresponding conductive path in an adjacent confronting wafer, whereby each row of said diodes in axial alignment are connected electrically in series; and an elongated rod of laser material extending through said first passages in said wafers; said light emitting diodes for emitting light of a predetermined frequency which frequency corresponds to the light absorption frequency of said rod.

2. The invention as defined in claim 1 further comprising: electrical lead means connecting together said rows of diodes electrically in series.

3. The invention as defined in claim 1 wherein said wafer is constructed of beryllium oxide and said conductive paths are constructed of metallized portions of said wafer.

4. The invention as defined in claim 1 wherein said means sandwiching said wafers together further comprises: nut and bolt means; and a second plurality of passages through said wafers for accommodating the passage therethrough of said bolts, and wherein said conductive path extends between the front and back side of each of said wafer through said second passages.

5. The invention as defined in claim 1 further comprising: a plurality of light reflective means each of which is sandwiched between an adjacent pair of wafers and which surrounds said plurality of diodes on said wafer for reflecting outwardly directed light inwardly toward said rod of laser material.

6. The invention as defined in claim 5 wherein said light reflective means comprises a washer shaped geometry having a light reflective inner periphery surrounding said plurality of diodes on a wafer.

7. A generator of coherent light energy comprising: a plurality of wafers of a material having properties of high electrical resistivity and high thermal conductivity, each of said wafers hving a passage therethrough with the passage in any one whfer being aligned with the passage in any of other of said wafers, each of said wafers having a conductor means affixed thereto which extends from a location on a front side of said wafer proximate said passage to an underlying location proximate said passage on the back thereof, a plurality of light emitting diode means each having a first and second end of opposite polarity, and each one of said diode means sandwiched between an adjoining pair of said plurality of wafers at a location proximate said passage therethrough having said first end in contact with a conductor means on one wafer and said second end in contact with a conductor means of an adjoining wafer, and a rod of laser material extending through said passages; said light emitting diodes for emitting light of a predetermined frequency which frequency corresponds to the light absorption frequency of said rod.

8. The invention as defined in claim 7 further comprising: a plurality of light reflective means each of which is sandwiched between an adjacent pair of wafers for reflecting outwardly directed light inwardly toward said rod of laser material.

9. The invention as defined in claim 8 wherein said light reflective means comprises a washer shaped geometry having a light reflective inner periphery.

References Cited

UNITED STATES PATENTS 3,284,722  11/1966  Gray _____ 331—94.5

RONALD L. WIBERT, Primary Examiner

P. K. GODWIN, JR., Assistant Examiner